United States Patent Office 3,505,206
Patented Apr. 7, 1970

3,505,206
PROCESS FOR THE HYDROCONVERSION OF HYDROCARBONS AND THE REGENERATION OF THE FOULED CATALYST
William H. Decker, Darien, Conn., assignor, by mesne assignments, to Atlantic Richfield Company, New York, N.Y., a corporation of Pennsylvania
No Drawing. Filed Nov. 14, 1967, Ser. No. 683,007
Int. Cl. C10g *13/02*
U.S. Cl. 208—108                                     15 Claims

ABSTRACT OF THE DISCLOSURE

Operation of a catalytic process for hydro-converting heavy, high-boiling hydrocarbons containing asphaltenes, nitrogen, sulfur, and/or metallic contaminants, is improved by a solvent wash of the catalyst bed. A reactor containing a settled bed of macrosize catalyst is taken off-stream when the catalyst bed is fouled by deposits and the catalyst is subjected to an upward flow of solvent, preferably benzene, at a rate sufficient to expand the bed. The expansion causes a scrubbing of the particles and aids in dissolution and/or flushing of extraneous material from the reactor. After the treatment the reactor is placed back on-stream.

---

This invention relates to catalytic hydrocarbon conversion processes. More particularly, the invention is directed to an improved system for conducting catalytic hydrocarbon conversions whereby catalyst activity is maintained at a suitable level and catalyst bed plugging is alleviated. The invention further concerns an improved system for the catalytic conversion of hydrocarbon residuals to provide stocks with lower levels of one or more of sulfur, nitrogen and metallic contaminants.

In high temperature catalytic conversion processes employing high boiling hydrocarbon feedstocks, the catalyst relatively quickly becomes at least partially deactivated by carbonaceous materials deposited on the catalyst. This problem is unusually severe when the hydroconversion is effected with the removal of one or more of nitrogen, sulfur and metallic contaminants from various heavy hydrocarbons such as reduced crudes, asphalts, whole or processed shale oils, tar sands or other heavy mineral oil residuals. For a number of years, considerable effort has been expended in attempting to carry out such hydroconversion processes in fixed catalyst bed reactors, where the fouling problems are most severe. The basic fixed-bed operation has the inherent advantage of simplicity when compared with the alternative schemes devised to process such materials, although the latter may avoid, at least partially, bed plugging, and to some extent, catalyst fouling, heretofore inherent in fixed bed processing. The alternative operations, such as moving or fluid bed systems, catalyst slurry processes, and the like, are far more complex and require substantial investment in expensive equipment.

While the fixed-bed processes are preferable, the system is more susceptible to catalyst fouling problems than the alternative processes. Severe plugging of the fixed catalyst bed occurs as materials from the high boiling fractions, such as so-called petroleum resins, asphaltenes, carbenes, carboids and the like, deposit on the catalyst surface. Extraneous materials in the feed, such as sulfur, nitrogen and oxygen compounds and various compounds of metals, such as iron, nickel and vanadium also contribute to the problem. As these materials deposit on the catalyst surfaces, catalytic activity is progressively impaired since the materials interfere with the ability of the reactants to reach the catalyst. As more material deposits, the catalyst bed eventually becomes severely plugged so that the hydrocarbon feedstock is less able to pass freely through the reactor.

High boiling or residual mineral oil fractions, particularly shale oils and petroleum residuals, contain significant amounts of a class of compounds known as asphaltenes. These materials are characterized by a high carbon-to-hydrogen ratio and are not subject to complete hydrogenation and/or cracking to lighter products except under extremely severe conditions. There is some evidence that complete hydrogenation of the asphaltenes and related materials may not be possible. Under severe thermal conditions, either with or without catalysts, the asphaltenes may undergo condensation to form carbenes and carboids, which are materials having an even higher carbon-hydrogen ratio and still more resistant to hydrogenation and/or hydrocracking than the asphaltenes themselves. The nature of these condensed materials is such that they remain in the catalyst bed and act as a matrix or as a film-forming binder for the retention of extraneous materials in the feedstock, such as tramp iron and other metallic impurities and the like, which results in a severe pressure drop across the reactor bed. Petroleum residuals also contain so-called petroleum resins, which tend to coat the catalyst particles, acting as a binder for some of the aforementioned compounds, and forming a film which retards the interaction among the catalyst, hydrogen, and the reactants.

All these deposited materials interact to deactivate the hydroconversion catalyst, and to block the catalyst bed causing a severe increase in pressure drop. The petroleum resins and a certain amount of oil will break down to form coke or carbon which also deposits on the catalyst, blocking the bed and reducing activity. As such deposits accumulate over a period of processing, the pressure drop across the catalyst bed will gradually increase and catalytic activity will decline until processing is no longer effective and it has been common practice to take the reactor containing the fouled catalyst off-stream, remove the entrained reactants, and then regenerate the catalyst by introducing air or other oxygen-containing gas at high temperature to burn off the deposits. Oxidation of the catalyst deposits is an expensive and time consuming procedure and is particularly disadvantageous with some heat-sensitive catalysts. The material which is burned is lost and the regeneration process is not effective for removing the poisonous metals from the catalyst. It is therefore highly desirable to provide a hydrotreating process for residual mineral oils which is capable of extended operation without excessive fouling of the catalyst and not requiring frequent oxidative regeneration procedures which are expensive and can be deleterious to the catalyst.

It is an object of the present invention to provide a method for hydroconverting mineral oil residual hydrocarbon stocks in fixed catalyst beds. It is a further object to provide a method whereby the hydroconversion may be conducted in fixed catalyst beds for economically attractive periods of time. It is a still further object of this invention to provide a method for hydroconverting heavy, high boiling hydrocarbon stocks in fixed catalyst beds without undue pressure drop across the bed and without excessive blocking and fouling of the bed and concurrent loss of catalyst activity. These and other objects are realized by the method disclosed herein.

It has now been found that the deposits formed on the catalyst in fixed catalyst bed hydrocarbon residual stock hydroconversion processes may be effectively removed by in situ washing with suitable solvents under conditions which cause expansion of the catalyst bed. The process of the present invention comprises conducting the hydroconversion of hydrocarbon residual mineral oil stocks with interruption of processing to wash the catalyst with a solvent to remove deposits before they condense to such extent that excessive amounts of insoluble coke are formed. The solvents employed are those which will dissolve the majority of the constitiuents of asphalt. The solvents boil essentially below about 800° F. and are preferably liquid at normal temperatures. During the washing the solvent flows upwardly through the catalyst, for instance in the presence or absence of another fluid, at velocities sufficient to cause expansion of the bed, for instance by at least about 1, preferably at least about 5 or 10, volume percent. Velocities which give bed expansions of up to about 50 volume percent are preferred to improve the washing operation as are velocities of at least about 50 percent above that needed to cause incipient expansion of the bed. As the velocity increases improved removal of contaminants from the catalyst bed can be obtained or the time required for a given extent of removal can be lessened, apparently due to increased agitation of the catalyst and better removal of fines from the catalyst bed. During the washing the solvent is below its critical temperature, but it may be above or below its critical pressure. Preferably the solvent is in the liquid phase in the catalyst bed. The temperature during washing is preferably about 100 to 500° F. with little if any, chemical conversion of the wash solvent taking place. Elevated washing pressures are preferred, e.g., about 500 to 3000 p.s.i.g., which avoids the unnecessary depressuring of the reactor materially below the processing pressure, thereby also avoiding a temporary decrease in catalyst activity which has been noticed when washing at near atmospheric pressure.

It has been found that among the effective organic solvents for removing the deposits from the catalyst bed are aromatic hydrocarbons such as benzene, toluene, xylenes, and other relatively pure aromatics. Benzene is a preferred solvent. Additionally, highly aromatic hydrocarbon streams, such as light cycle oil, e.g., boiling primarily in the range of about 400 to 650° F., aromatic extracts of such refinery streams as kerosine, diesel fuel, heating oil, and the like, obtained by treatment with solvents such as $SO_2$, furfural, and the like, are also effective. Such aromatic streams often contain about 20 to 95 weight percent aromatics, preferably at least about 60 or even at least about 90%. Usually the higher the aromatic content of such streams, the more the deposits will be soluble therein. While aromatic solvents will not dissolve coke or metallic constituents on the catalyst, a large proportion of such deposits can be flushed from the surface of the catalyst and out of the reactor by the action of the solvent. Aside from the aromatic solvents others may be employed, among which are carbon disulfide, halogenated hydrocarbons, e.g., carbon tetrachloride, turpentine, etc. Excessive amounts of olefins in the solvent should be avoided since they may polymerize in the catalyst bed at elevated temperatures and pressures to form undesirable solids.

The cycle times, i.e., the lengths of the processing or on-stream and washing periods, can depend on various factors such as the extent and nature of the carbonaceous and metallic contaminants deposited in the catalyst bed due to the characteristics of the hydrocarbon feed, the processing and washing temperatures and pressures employed, the nature and velocity of the solvent and the permissible decrease in catalyst activity and increase in bed plugging the operation can economically endure. Processing cycles should be long enough to give a significant deposition of materials in the catalyst bed and periods of at least about 3 days, preferably at least about 6 days, duration seen indicated for reasons of economy, while washing times of at least about 1 hour, preferably at least about 6 hours, may be needed to give substantial to even essentially complete removal of fines from the catalyst at bed expansions of the order of about 5 to 20 volume percent. In such operations, the washed catalyst particles may still contain metal or carbonaceous contaminants, and the wash medium has not in many operations contained any significant amount of catalyst fines.

Although in the method of this invention hydrocarbon processing can be continued until a substantial catalyst bed pressure drop has occurred, periodic washing before any significant pressure drop is experienced can result in maintaining a higher overall activity level perhaps due to fewer catalyst pores being blocked by carbon deposition. Also, the entire catalyst bed may be agitated during washing in such a manner that a top to bottom circulatory motion of the catalyst particles is obtained. Movement of the bed serves to promote contact between the solvent and the catalyst particles. In addition, the motion produces a scouring action on the catalyst due to the random movement of the particles, causing them to rub against one another and against the wall of the reactor. This scouring action serves to loosen and remove the deposits from the catalyst and assists in the dissolving and/or flushing away of these materials by the solvent. In this fashion, even the heaviest and least soluble of the deposits can be entrained in the solvents and flushed away.

A continuous upflow of solvent alone at an appropriate mass velocity to expand the catalyst bed can be used or simultaneous gas flow can be employed. The gas can be hydrogen but other gases, e.g., nitrogen, carbon dioxide, flue gas, and the like, can also be utilized in place of hydrogen.

The catalysts employed in the process of this invention are of macrosize variety, i.e., at least about $\frac{1}{64}$ inch up to about $\frac{1}{2}$ inch or more in diameter, preferably about $\frac{1}{16}$ to $\frac{1}{4}$ inch in diameter. Catalyst particle lengths can be of similar dimensions but may extend up to about 1 inch or somewhat more. Particles essentially spherical in shape or having lengths up to about twice the diameter can be used with advantage since they are more likely to form a settled processing bed of uniform size after each washing period.

The processing cycles which generally precede and follow the washing stage of the method of this invention employ a settled catalyst bed and serve to convert the various residual mineral oils and their fractions in the presence of free or molecular hydrogen fed to the reaction zone. The residual oils can be whole oils or distilled portions thereof but may be obtained as the result of retorting or other means for separating the oils from solids such as occurs in the production of shale oils. The temperatures of the hydroconversion are elevated, usually being in the range of about 500 to 1000° F., often about 700 to 950° F. The hydrocarbon oil may or may not undergo any substantial cracking during the conversion. Thus in typical hydrosulfurization operations cracking to hydrocarbon materials boiling lower than the initial boiling point of the hydrocarbon feed can be less than about 5, or even less than about 2, weight percent. On the other hand in a system designed for hydrocracking, the product may contain at least about 40 weight percent of hydrocarbon materials boiling below the initial boiling point of the hydrocarbon feed. The extent of cracking obtained in any of these operations can be as desired. Other reactions conducted in typical hydroconversion systems include denitrogenation, hydrogenation and dehydrogenation. Elevated pressures are normally employed in the various hydroconversion operations, e.g., about 300 to 5000 p.s.i.g., preferably about 500 to 3000 p.s.i.g., with the hydrogen rate being at least about 500, preferably about 1500 to 12,000 standard cubic feet per barrel of hydrocarbon feed. Suitable space velocities are in the range of about 0.1 to 15, preferably about 0.5 to 8, WHSV.

The catalyst employed in the hydroconversion process can be the various sulfur-resistant catalysts often employed in the treatment of heavy petroleum oils and also referred to as hydrogenation-dehydrogenation catalysts. Examples of suitable catalytic metal components include the members of Group VI–B in the Periodic Table, i.e. chromium, molybdenum and tungsten; vanadium; and the iron group metals of Group VIII, especially cobalt and nickel. Generally these metals are supported, e.g., on conventional refractory oxide catalyst supports such as alumina, silica, magnesia, zirconia, etc. and mixtures thereof and the metals are present in catalytically effective amounts, for instance about 2 to 30 weight percent, in the form of the oxides, sulfides or other compounds thereof. Mixtures of these materials or compounds of two or more of the oxides or sulfides can be employed, for example, mixtures or compounds of the Group VIII metal oxides or sulfides with the oxides or sulfides of Group VI–B constitute very satisfactory catalysts. Examples of such mixtures or compounds are nickel molybdate, tungstate or chromate (or thiomolybdate, thiotungstate or thiochromate) or mixtures of nickel and/or cobalt oxides with molybdenum, tungsten or chromium oxides. As the art is aware, these catalytic ingredients are generally employed while disposed upon a suitable carrier of the solid oxide refractory type, e.g., a predominantly calcined or activated alumina or silica alumina, which can be mainly silica. Commonly employed catalysts have about 1 to 10% of a Group VIII metal and 5 to 25% of a Group VI–B metal (calculated as the oxide).

The process of the present invention is not limited to a single reactor system and a plurality of reactors can be employed in any manner desired, for instance, alternatively, sequentially, swing reactor, guard reactor, etc. or combinations of such. Reactors are ordinarily restricted in commercial usage to about 100 feet maximum height due to various mechanical limitations. It can be desirable to maintain the length/diameter ratio within a range of about 2 to 25, preferably 10 to 20, for the most effective results. Also the reactors can be equipped to regenerate the catalyst by carbon burn-off.

The following specific examples will serve further to illustrate the present invention.

EXAMPLE I

A heavy residual petroleum stock was hydrotreated downflow over a 1 inch in diameter, 15 inch deep settled fixed bed of commercially available, $1/16''$ x $3/16''$ extruded cobalt-molybdena catalyst made up of about 3 wt. percent cobalt and about 12 wt. percent molybdena on an activated alumina base, at 1,000 p.s.i.g., 1 WHSV, 750° F., and 4,000 s.c.f./b. hydrogen. Analysis of the reactor effluent after 62 and 350 hours of processing disclosed the following:

|  | Processing Time | |
|---|---|---|
|  | 62 hrs. | 350 hrs. |
| Hydrogen sulfide and ammonia, wt. percent | 1.10 | 0.95 |
| Dry gas ($C_2$ minus), wt. percent | 0.29 | 0.19 |
| Propane, wt. percent | 0.07 | 0.07 |
| Butanes, wt. percent | 0.14 | 0.09 |
| Pentanes, wt. percent | 0.23 | 0.04 |
| Initial boiling point and heavier, wt. percent | 98.91 | 99.12 |
| Total | 100.74 | 100.46 |
| Hydrogen consumption, s.c.f./b | 480 | 313 |
| Pressure drop across reactor, p.s.i | 1.1 | 21.7 |

Feed and product inspection tests are shown below:

|  |  | Processing Time | |
|---|---|---|---|
|  | Feed | 62 hrs. | 350 hrs. |
| Gravity, °API | 10.7 | 13.6 | 13.2 |
| Pour point, °F | +30 | +20 | +20 |
| Sulfur, wt. percent | 1.46 | 0.506 | 0.669 |
| Nitrogen, wt. percent | 0.34 | 0.30 | 0.33 |
| Hydrogen, wt. percent | 10.25 | 10.88 | 10.68 |
| Viscosity, SFS at 122° F | 180.2 | 88.6 | 104.6 |
| Flash (COC), °F | 325 | 320 | 330 |
| Carbon Residue, wt. percent | 11.77 | 8.17 | 8.53 |

EXAMPLE II

Another run was made using the same petroleum feed and conditions as in Example I with intermittent catalyst bed washing with upflow liquid benzene. Processing cycles were about 50 to 72 hours on stream before washing. The washings were conducted by taking the reactor off processing and contacting the catalyst for 30 minutes with liquid benzene and nitrogen at 100° F. and 1000 p.s.i.g. at velocities of approximately 125 cc./min. of $N_2$ and 0.25 liter/min. of benzene, followed by washing of the catalyst for 2 hours at 100° F. and 100 p.s.i.g. at the same $N_2$ flow rate but at 0.5 liter/min. of benzene which gives a bed expansion of about 5 volume percent. The following tabulation shows results after 140 and 396 hours on-stream processing time:

|  | Processing Time | |
|---|---|---|
|  | 140 hrs. | 396 hrs. |
| Hydrogen sulfide and ammonia, wt. percent | 1.14 | 1.50 |
| Dry gas ($C_2$ minus), wt. percent | 0.29 | 0.34 |
| Propane, wt. percent | 0.12 | 0.12 |
| Butanes, wt. Percent | 0.16 | 0.21 |
| Pentanes, wt. percent | 0.00 | 0.05 |
| Initial boiling Point and heavier, wt. percent | 98.91 | 98.39 |
| Total | 100.62 | 100.61 |
| Hydrogen consumption, s.c.f./B | 410 | 400 |
| Pressure drop across reactor, p.s.i | 1.3 | 3.2 |

Product inspection tests are shown below:

|  | Processing Time | |
|---|---|---|
|  | 140 hrs. | 396 hrs. |
| Gravity, °API | 13.6 | 13.3 |
| Pour point, °F | +15 | +20 |
| Sulfur, wt. percent | 0.489 | 0.529 |
| Nitrogen, wt. percent | 0.31 | 0.32 |
| Hydrogen, wt. percent | 10.80 | 10.70 |
| Viscosity, SFS at 122° F | 82.4 | 70.8 |
| Flash (COC), °F | 365 | 340 |
| Carbon residue, wt. percent | 7.77 | 8.67 |

It is evident from a comparison of data from Examples I and II that the catalyst bed washing resulted in a lower pressure drop, a greater ability to desulfurize residual stocks, and maintenance of catalyst activity at a higher overall level for a longer period of time.

EXAMPLE III

Asphalt was hydrocracked using a reactor containing a settled fixed bed of catalyst having the same components as the catalyst in Example I. The reactor was used to process the hydrocarbon downflow and then subjected to washing upflow with benzene and these operations were alternated over a plurality of cycles. The data collected included the following:

|  | Feed | Test No. | | | | |
|---|---|---|---|---|---|---|
|  |  | 2 | 23 | 24 | 25 | 27 |
| (1) Total hours on oil at end of test period | | 175 | 1,234 | 1,258 | 1,306 | 1,402 |
| (2) Test length (hours sample collected in test period) | | 23 | 8 | 8 | 8 | 8 |
| (3) Hours since previous wash (beginning of test period) | | 90 | 24 | 48 | 96 | 92 |
| (4) Process conditions: | | | | | | |
| Pressure, p.s.i.g | | 2,000 | 2,000 | 2,000 | 2,000 | 2,000 |
| $H_2$ rate, s.c.f./b | | 4,000 | 4,000 | 4,000 | 4,000 | 4,000 |
| WHSV #HC/hr./#cat | | 1.36 | 1.34 | 1.38 | 0.48 | 0.52 |
| Temperature, °F | | 817 | 809 | 807 | 808 | 809 |
| (5) Yields: | | | | | | |
| $H_2S$, $NH_3$ and $H_2O$, wt. percent | | 1.7 | 1.6 | 1.5 | 1.7 | 1.8 |
| Dry gas ($C_2$ minus), Dry gas ($C_2$ minus), wt. percent | | 0.7 | 0.9 | 0.7 | 1.4 | 1.5 |
| Propane, vol. percent | | 0.7 | 0.9 | 0.7 | 1.3 | 0.8 |
| Total butanes, vol. vol. percent | | 0.9 | 1.0 | 0.7 | 1.4 | 2.0 |
| $C_5$–180° F. gasoline, percent | | 1.6 | 1.7 | 1.5 | 2.2 | 2.0 |
| 180–370° F. gasoline, vol. percent | | 1.6 | 1.7 | 1.9 | 2.8 | 2.5 |
| 370–650° F. light gas oil, vol. percent | | 9.8 | 12.5 | 8.9 | 17.3 | 16.6 |
| 650–950° F. heavy gas oil, vol. percent | | 27.8 | 32.5 | 31.6 | 41.3 | 40.0 |
| 950° F. + (unconverted asphalt), vol. percent | | 60.1 | 52.7 | 56.9 | 38.4 | 40.1 |
| Hydrogen consumption, s.c.f./b | | 435 | 534 | 437 | 683 | 592 |
| Conversion (950° F. minus), vol. percent | | 39.9 | 47.3 | 43.1 | 61.6 | 59.9 |
| (6) Product inspection tests (Stripped Product): | | | | | | |
| Gravity, °API | 12.1 | 16.4 | 17.5 | 16.2 | 19.4 | 18.9 |
| Sulfur, wt. percent | 1.69 | 0.735 | 0.674 | 0.774 | 0.461 | 0.523 |
| Nitrogen, wt. percent | 0.41 | 0.33 | 0.33 | 0.35 | 0.35 | 0.37 |
| Oxygen, wt. percent | 0.75 | 0.27 | 0.41 | 0.44 | 0.53 | 0.09 |
| Hydrogen, wt. percent | 11.06 | 11.55 | 11.66 | 11.55 | 11.88 | 11.69 |
| Carbon Residue (con.), wt. percent | 14.39 | 9.41 | 10.80 | 7.35 | 8.80 | 8.77 |
| Pour point, °F | 80 | 25 | 35 | 35 | 30 | 45 |
| Viscosity (Furol) at 122° F | [1] 235.3 | 292.8 | 169.4 | 337.5 | 58.1 | 75.2 |

[1] At 210° F.

Comparison of tests in each set of the data shows the effect of catalyst bed washing at different intervals of time, with the shorter wash times producing lower sulfur products, higher conversion, and greater hydrogen consumption at essentially the same process conditions. In general, product distribution is also improved by catalyst bed washing in that more light and heavy gas oils are produced, although there was little difference in light ends and total gasoline produced.

In the system of Example III the catalyst bed was approximately 2 inches in diameter and 15 inches deep. In the washing stages the operations are essentially as follows: drop the processing temperature to about 500° F. and the pressure to about 1000 p.s.i.g. while still onstream, stop the oil feed, purge the catalyst with hydrogen, purge the catalyst with nitrogen at the approximate conditions of 500 cc./min., 500° F. and 1000 p.s.i.g., introduce benzene for 30 minutes at the rate of about 1 liter/min. while maintaining the nitrogen flow which reduces the temperature to about 100° F., depressure to about 100 p.s.i.g., wash with benzene at the rate of about 2 liters/min. and nitrogen flow at about 500 cc./min. at about 100° F. and 100 p.s.i.g. for about 2 hours which provides a bed expansion of about 5 volume percent, lower the benzene flow rate to about 1 liter/min., raise the temperature to about 400 to 500° F. and the pressure to processing pressure, stop benzene feed, purge with the nitrogen flow, stop the nitrogen flow, start hydrogen flow, start oil feed, and raise system to operating temperature. It is preferred to have higher flow rates during washing to give an expansion of the catalyst bed of at least about 10 volume percent but limitations of the equipment employed kept this from being done.

It is claimed:

1. A process for the hydroconversion of residual mineral oil which comprises contacting said oil at an elevated, hydroconversion temperature in the presence of hydrogen, with a settled, fixed bed of macrosize, hydroconversion catalyst, continuing such hydroconversion to deposit constituents of the residual mineral oil in the catalyst bed, discontinuing said contact of the catalyst and residual mineral oil, subjecting the resulting contaminated catalyst bed to an upflow of fluid boiling below about 800° F. and exhibiting solvency for the majority of the constituents of asphalt under conditions which expand the bed beyond its settled volume and at a temperature below the critical temperature of said fluid to remove contaminants from the catalyst, and again conducting said hydroconversion in contact with a settled bed of the resulting catalyst.

2. The process of claim 1 wherein said fluid is aromatic hydrocarbon.

3. The process of claim 2 wherein the aromatic hydrocarbon is normally liquid.

4. The process of claim 3 wherein the aromatic hydrocarbon is benzene.

5. The process of claim 3 wherein the hydroconversion effects desulfurization of the residual mineral oil with their being in the hydrocarbon product less than about 5 weight percent of hydrocarbons boiling below the initial boiling point of the residual mineral oil feed.

6. The process of claim 3 wherein the hydroconversion is hydrocracking with there being in the hydrocarbon product at least about 40 weight percent of hydrocarbon materials boiling below the initial boiling point of the residual mineral oil feed.

7. The process of claim 3 wherein the catalyst bed is expanded about 5 to 50 volume percent while being subjected to said upflow of fluid for the removal of contaminants.

8. A process for the treatment of residual mineral oils which comprises contacting said oil at about 700 to 950° F. and a pressure of about 300 to 5000 p.s.i.g. in the presence of hydrogen, with a settled, fixed bed of macrosize, sulfur-resistant, hydrogenation-dehydrogenation catalyst for a period of at least about six days, discontinuing said contact of the catalyst and residual mineral oil, washing the catalyst bed with an upflowing stream of normally liquid, aromatic hydrocarbons at a temperature of about 100 to 500° F. under conditions which cause an expansion of the catalyst bed of at least about 5 volume percent to remove from the catalyst bed contaminants resulting from the treatment of said residual mineral oil, and resuming said treatment of residual mineral oil in contact with a settled bed of the washed catalyst.

9. The process of claim 8 in which the aromatic hydrocarbon is in the liquid phase during said washing and the washing is conducted for at least about 1 hour.

10. The process of claim 9 in which the aromatic hydrocarbon is benzene.

11. The process of claim 9 in which the bed is expanded by about 5 to 50 volume percent during washing.

12. The process of claim 11 in which the pressure during washing is about 500 to 3000 p.s.i.g.

13. The process of claim 12 in which the aromatic hydrocarbon is benzene.

14. The process of claim 13 wherein the hydroconversion effects desulfurization of the residual mineral oil with there being in the hydrocarbon product less than about 5 weight percent of hydrocarbons boiling below the initial boiling point of the residual mineral oil feed.

15. The process of claim 13 wherein the hydroconversion is hydrocracking with there being in the hydrocarbon product at least about 40 weight percent of hydrocarbon materials boiling below the initial boiling point of the residual mineral oil feed.

References Cited

UNITED STATES PATENTS

| 1,933,508 | 10/1933 | Peck | 208—108 |
| 2,346,652 | 4/1944 | Alther | 208—113 |

DELBERT E. GANTZ, Primary Examiner

A. RIMENS, Assistant Examiner

U.S. Cl. X.RR.

208—213; 252—412, 474